United States Patent [19]
Weissenbach

[11] 3,752,355
[45] Aug. 14, 1973

[54] CONTAINED VOLATILE LIQUIDS VAPOR RETENTION SYSTEM

[75] Inventor: Joseph Weissenbach, Los Angeles, Calif.

[73] Assignees: Joseph Weissenbach; Vernon D. Beehler, both of Los Angeles, Calif.; part interest to each

[22] Filed: Jan. 5, 1971

[21] Appl. No.: 104,079

[52] U.S. Cl. .......................... 220/86 R, 220/85 B
[51] Int. Cl. ....... B65d 3/00, B67c 3/00, B65d 51/16
[58] Field of Search .......................... 220/85 B, 86 R

[56] References Cited
UNITED STATES PATENTS

| | | | |
|---|---|---|---|
| 2,179,682 | 11/1939 | Booth | 220/85 B |
| 2,378,467 | 6/1945 | DeKiss | 220/85 B UX |
| 2,584,953 | 2/1952 | Wiggins | 220/85 B UX |
| 3,158,296 | 11/1964 | Cornelius | 220/85 B UX |
| 3,470,907 | 10/1969 | Shokey | 220/86 R X |
| 3,477,611 | 11/1969 | Niles | 220/86 R |
| 3,334,779 | 8/1967 | Smith | 220/86 R |
| 3,172,556 | 3/1965 | Stiefel | 220/85 B X |
| 2,916,058 | 12/1969 | Unthank | 220/85 B X |

FOREIGN PATENTS OR APPLICATIONS

| | | | |
|---|---|---|---|
| 10,419 | 1844 | Great Britain | 220/85 B |
| 836,075 | 6/1960 | Great Britain | 220/85 B |

*Primary Examiner*—George E. Lowrance
*Attorney*—Beehler, Arant & Jagger

[57] ABSTRACT

A tank for volatile fuel has a flexible bag inside with its own breather valve separate from the fill pipe for the tank. When the tank is filled, a muff around the fill pipe seals the tank against exhaust of volatile vapors and air from the bag is forced out the breather valve as it is displaced by the liquid fuel until a valve element on the bag shuts off the breather valve, whereby only pure air is vented to the atmosphere. As the tank empties during use, air returns through the breather valve to fill the bag and replace the space in the tank previously occupied by the liquid fuel.

13 Claims, 15 Drawing Figures

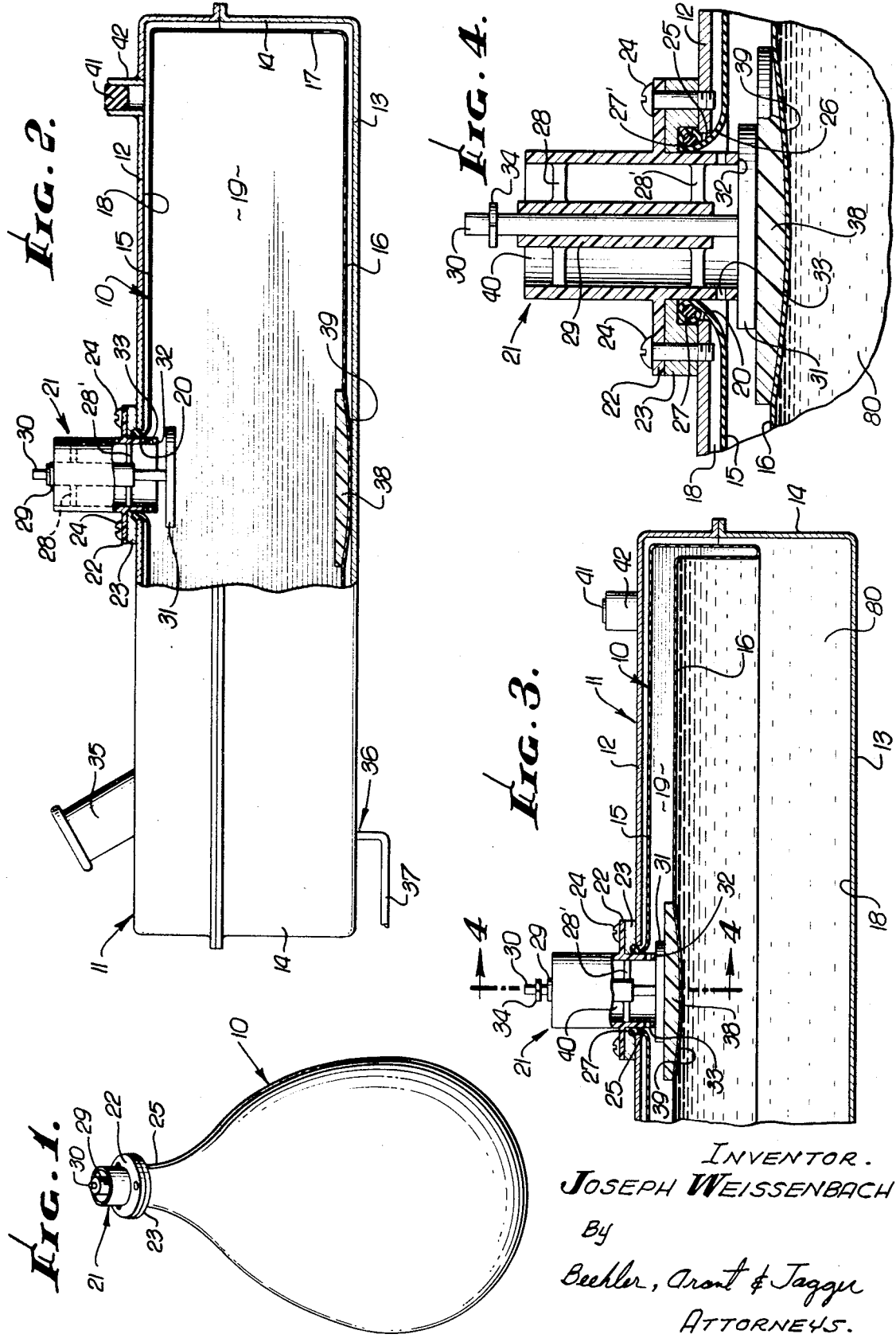

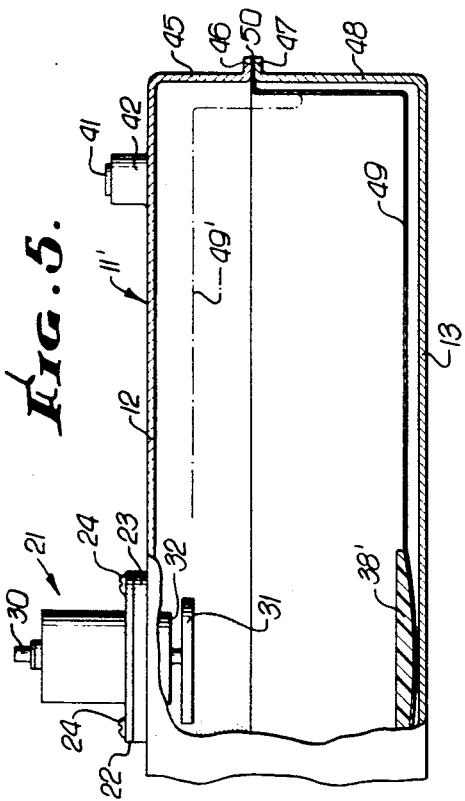

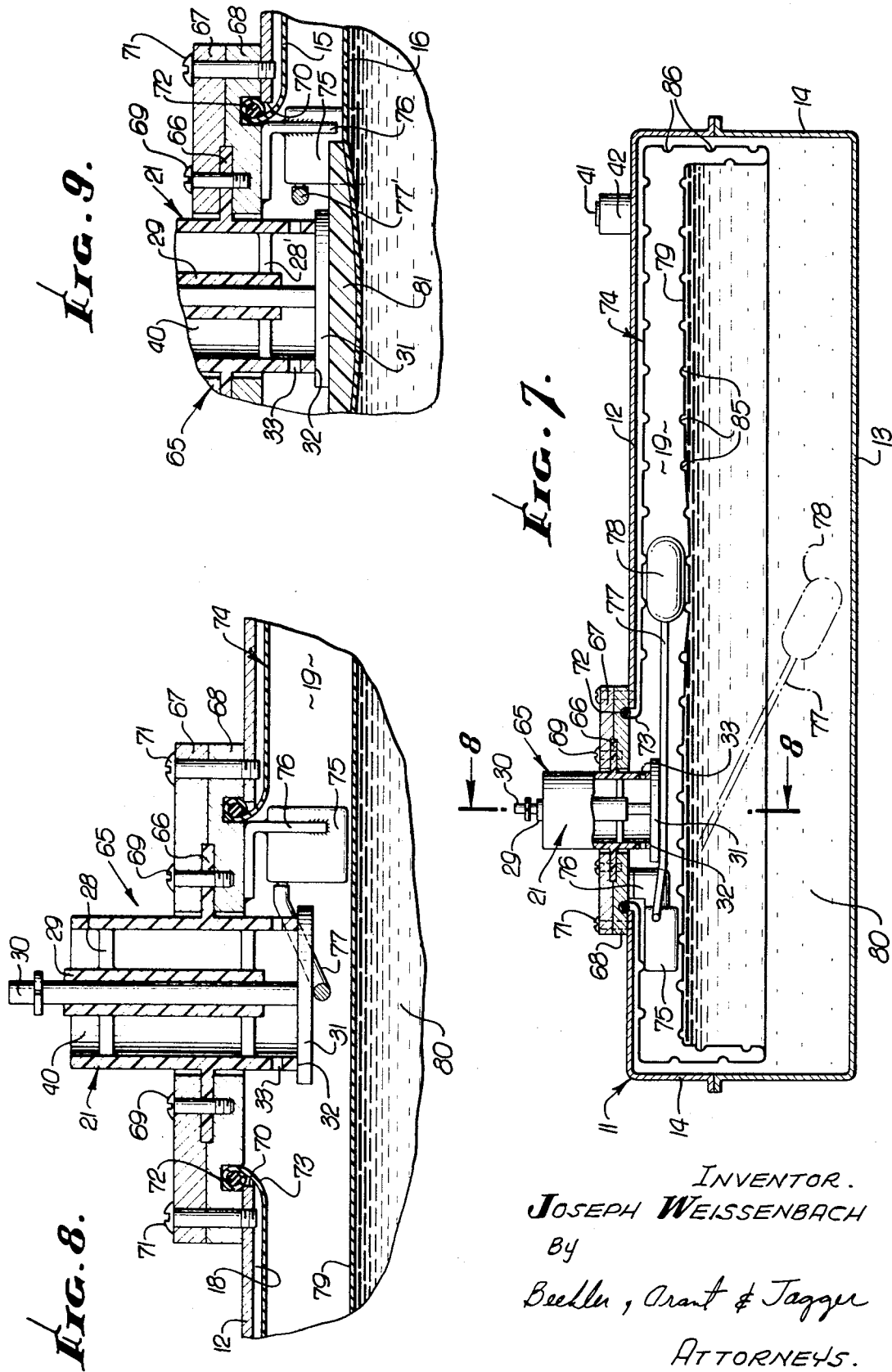

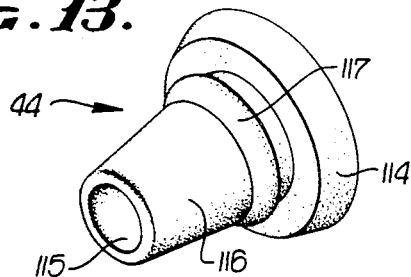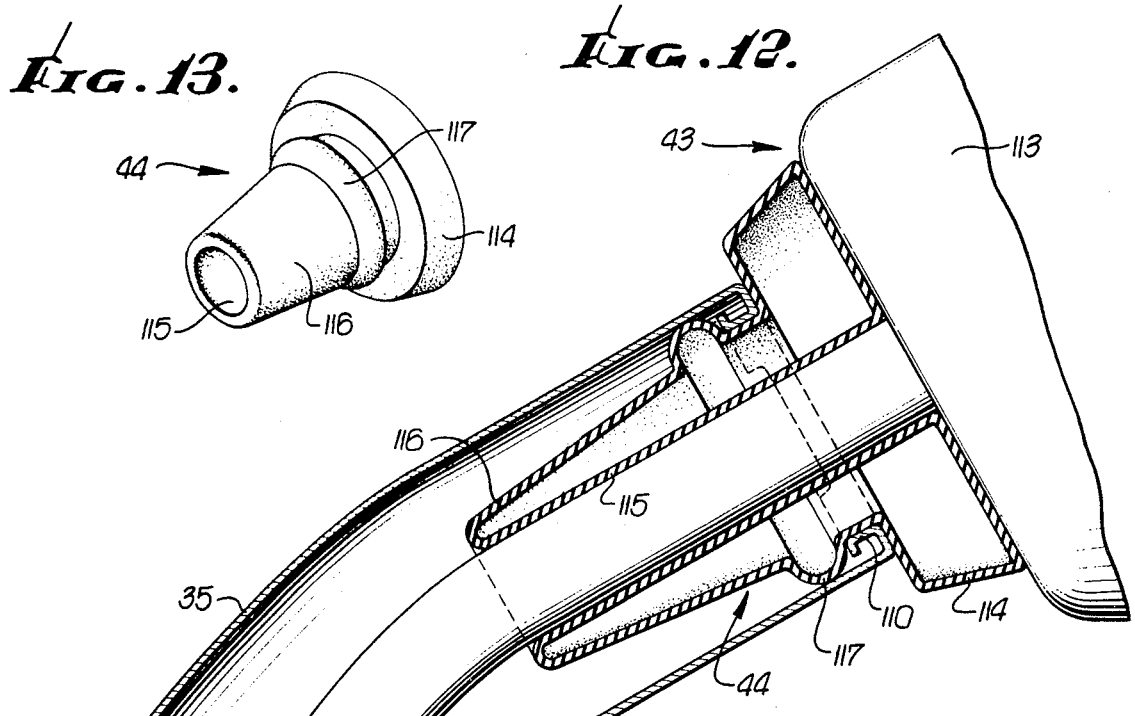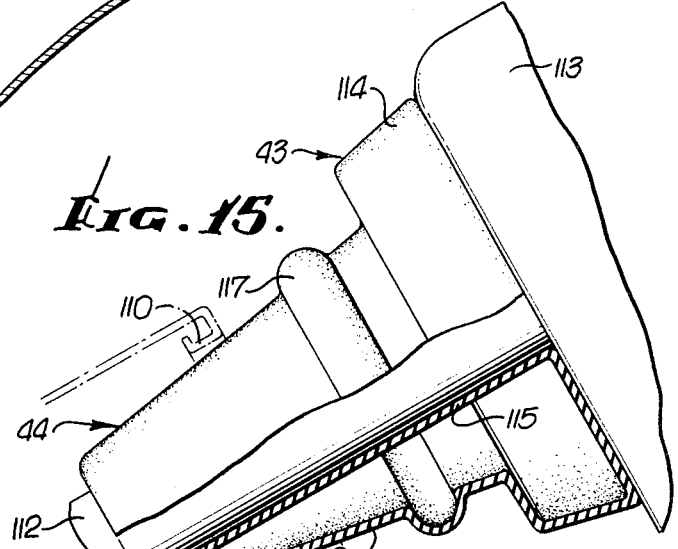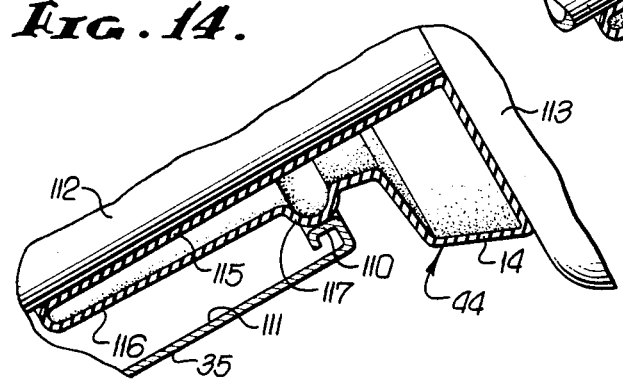

CONTAINED VOLATILE LIQUIDS VAPOR RETENTION SYSTEM

A highly objectionable condition throughout areas where there is a high concentration of internal combustion engines is the presence of a high percentage of unburned hydrocarbon vapor, which comes from volatilization of raw hydrocarbon fuel, such as gasoline. Such vapor comes largely from fuel tanks on vehicles, fuel dispensing equipment, and fuel storage tanks, such vapors being displaced from the tanks and into the atmosphere when the tanks are filled with liquid fuel.

In another situation where a tank may contain finely divided solids, such as grain or combustable powder, a comparable condition may exist.

At the present there is no known practical, economical, and virtually universal means for either curtailing or preventing harmful and dangerous vapor emissions caused by displacement of such vapors from storage tanks, mobile fuel tanks, and other containers of volatile liquids, when said tanks are being replenished with volatile liquids. In the instance of mobile fuel tanks (automotive, marine, aircraft, etc.), there is presenty no means in existence of preventing overfilling and subsequent overflowing as the fuel expands due to thermal rise or due to agitation by vehicle motion. In addition to the foregoing there seems to be no means in existence of preventing pump operators in automobile filling stations from accidentally or arbitrarily allowing anywhere from one-half pint to more than one quart of motor fuel to overflow from the tank when the customer calls for a tank to be filled.

Studies have revealed that each 15 gallons of volatile liquids dispensed emits each time a tank is refilled by displacement 2 cubic feet of saturated vapor. This involves (1) filling the customer's tank, (2) replenishing the dispenser's storage tank, (3) replenishing the delivery vehicle's cargo tanks.

Assuming a MINIMUM of three refill or replenishment cycles per each fifteen gallons of volatile liquid dispensed, and citing only motor grade gasoline (excluding marine, off-highway, and aviation fuels) as taxed for use, at 2 cubic feet of saturated vapor per each cycle, it becomes apparent that 6 cubic feet of vapor are emitted per 15 gallons dispensed. It has been established that 18 cubic feet of saturated vapor may be recondensed into at least 1 gallon of liquid weighing at least 5 pounds. Official, published figures reveal that 8,690,000 gallons of motor grade gasoline are consumed daily in on-highway use alone in Los Angeles County. On this basis the following calculation reveals this atmospheric pollutant in tons of material:

6 cu.ft. 8,690,000/15 gallons= 3,476,000 cu.ft. and 3,476,000/18 cu.ft.= 193,111 gallons, and 193,111 gallons at 5 lbs./gallon = 965,666 pounds, and 965,666 pounds = 428.8 TONS PER DAY.

Published figures reveal that an additional 370 tons of emissions by evaporation from fuel tanks and carburetors per day contribute further to the problem, and 80 percent of that figure is tank evaporation, or 296 tons which, when added to the replenishment cause factor, produces a grand total of 725 tons of raw, saturated, unburned hydrocarbons per day in Los Angeles County alone.

Examples of tanks involved in the above mentioned calculations and related conditions are motor vehicle, boat, storage tanks in service stations and bulk storage vessels containing volatile liquids which, when exposed to air, produce vapors which pose a threat to their environs and the ecology in general.

In the instance of gasolines, as an example, the vapor pressures of which are below atmospheric under normal conditions, the circumstance is such that when exposed to air, the surface molecules interact with the molecules of the air to which they are exposed, thereby kinetically producing vapors which eventually become saturated and expansible to the pint of evaporation. If the surface of the liquid could in some manner be isolated from air, vaporization would only result at comparatively high temperatures and/or low atmospheric pressures.

Currently such tanks and vessels, being subject to withdrawal and replenishment cycles, have affixed to them a static venting system of one sort or another, all of which expose their vapor emissions directly to the surrounding atmosphere and by dispersion to the ecology in general. When these tanks are filled, the saturated vapors in them are displaced and expressed into the surrounding atmosphere at the rate of 2 cubic feet of vapor for each 15 gallons of liquid introduced, coupled with vapors exuded as a result of excessive evaporation caused by interaction of surface molecules with air, plus thermal and barometric changes, agitation, etc. In the instance of motor grade gasolines approximately 18 cubic feet of vapors may be recondensed into 1 gallon of liquid weighing 5 or more pounds.

There is in the prior art an assortment of structures showing one flexible container or another housed within a tank of some kind directed to the solution of various problems. Reference is made to prior patents in this general field of activity, namely:

| | | | |
|---|---|---|---|
| 1,977,862 | Scholtes | 2,611,512 | Fashay |
| 2,111,839 | Chenicek | 2,758,747 | Stevens |
| 2,387,598 | Mercier | 2,798,639 | Urban |
| 2,542,929 | Kimball | 3,477,610 | Hansen |

Sundry deficiencies are present in the patents identified above which makes them unsuitable for eliminating objectionable gases resulting from filling and emptying storage tanks for such materials as volatile liquids and explosive vapors.

Some of the prior structures undertake to use the interior flexible bag as a container for the fluid to be stored. This expedient has serious defects, among them being excessive wear of the flexible container when such a flexible container is shifted about partially full. Others of the prior patents show somewhat complex structures unsuited, by reasons both of performance and cost, to use on a conventional tank for the well-known combustion engine.

It is therefore among the objects of the invention to provide a new and improved fuel tank assembly for volatile liquids of such construction that vaporized fuel is inhibited from passing from the tank to the atmosphere.

Another object of the invention is to provide a new and improved fuel tank assembly which by use of a very simple expedient prevents discharge of volatilized fuel from the tank to the atmosphere when the tank is being filled with fresh liquid fuel.

Still another object of the invention is to provide a new and improved device for use with a fuel tank to prevent emission of volatilized fuel vapors from the tank of such construction that it can be inserted and made operative with fuel tanks already in service.

Still another object of the invention is to provide a new and improved interior accessory for a fuel tank which once inserted and in operative position permits breathing into and out of the tank of atmospheric air only and which, moreover, is of such construction that it will operate in a dependable fashion without prospect of failure to collapse when the tank is filled and which is of such construction that prospect of forming sealed prockets detrimental to effective operation is substantially prohibited.

Still further among the objects of the invention is to provide a new and improved fuel tank assembly incorporating an air breathing, collapsible bag located within the fuel tank, and which is of such construction that it is inexpensive to construct, simple to install, and which, though substantially filling the interior of the tank, permits float level gauges to function in normal fashion.

With these and other objects in view, the invention consists of the construction, arrangement, and combination of the various parts of the device, whereby the objects contemplated are attained, as hereinafter set forth, pointed out in the appended claims and illustrated in the accompanying drawings.

In the drawings:

FIG. 1 is a perspective view of a typical flexible bag of the kind usable in the assembly.

FIG. 2 is a side elevational view partially broken away showing the flexible bag in place when the tank is empty.

FIG. 3 is a framentary sectional view similar to FIG. 2 showing the position of the parts when the tank is substantially full.

FIG. 4 is a fragmentary longitudinal sectional view on the line 4—4 of FIG. 3.

FIG. 5 is a side elevational view partially broken away showing a second form of the invention.

FIG. 6 is a transverse sectional view partially broken away showing a form of the invention in which a fuel level indicator is installed and wherein a closed circuit relief is included.

FIG. 7 is a longitudinal sectional view of still another form of the device.

FIG. 8 is a fragmentary sectional view on the line 8—8 of FIG. 7.

FIG. 9 is a fragmentary sectional view of accessories of FIG. 7 and 8 in a different position.

FIG. 10 is a side perspective view of another form of the invention.

FIG. 11 is a side perspective view of still another form of the invention.

FIG. 12 is a longitudinal sectional view of a nozzle provided with a muff.

FIG. 13 is a side perspective view of the muff.

FIG. 14 is a fragmentary sectional view of the muff engaging a fill pipe.

FIG. 15 is a side elevational view partially in section showing a nozzle being withdrawn from a fill pipe.

The invention incorporates a highly flexible bag or container 10, or multiplicity of bags or containers, fabricated to substantially the internal dimensions (clearances and tolerances being peculiar to each size and shae of vessel) of a liquid storage tank or vessel 11, either stationary or mobile, having one or more openings, the peripheral edges of the openings being hermetically sealed to the body of a fluid level controlling breather valve (FIG. 1). For purposes of simplicity, discussion hereafter will consider one bag and one valve per bag, the consideration of a multiplicity of bags and valves being to accommodate shapes and sizes of vessels precluding the feasibility of one bag. The fluid level controlling valve allows air to enter or be expressed from the bag as the liquid level in the vessel changes.

The flexible bag or container 10 may be fabricated of a suitable inert, tough, highly flexible material of satisfactory degree of elongation and resistance to permeability of vapors to which it may be exposed. When inserted in the vessel and inflated, the bag is sized to substantially occupy the entire chamber within the tank.

In an embodiment of the invention chosen for the purpose of illustration the tank 11 is shown as having a top wall 12, a bottom wall 13, and side walls 14. When the bag 10 is of indeterminate form, as illustrated in FIG. 1, the area of the bag should be of such size that, when inserted in the tank 11 and inflated as shown in FIG. 2 the bag will provide a top wall 15, a bottom wall 16 and side walls 17, and will substantially fill the interior of the chamber identified by the reference character 18. Moreover, when inflated the bag provides, on its interior, an air space 19 only slightly smaller than the volume of the chamber 18 within the tank.

In the top wall 12 of the tank, as shown in FIGS. 1, 2, and 3, there is an opening 20 in which is located a breather valve assembly 21. In the embodiment shown there is a flange 22 on the breather valve assembly applied over a washer 23, and secured by means of screws 24. The opening 20 may be the opening already present in the tank where the float control mechanism is located.

A collar 25 surrounding an appropriate opening 26 in the breather valve is provided with a sealing ring 27 adapted to be clamped by the washer 23 when the breather valve assembly 21 is fastened in place, thereby to seal the opening 20 in the top of the tank.

Within the breather valve assembly 21 there are spiders 28, 28 centrally mounting a sleeve 29 in which reciprocates a stem 30 of a breather valve element 31, the breather valve element 31 being adapted to seat upon a breather valve seat 32. Expansion bleed holes 33 prevent the valve element 31 from completely sealing off the interior space within the bag. A split ring stop 34 at the top of the stem 30 prevents the stem from falling downwardly beyond a limited position.

Near the top of the tank 11 is a fill pipe 35, there being provided a conventional feed port 36 supplying a fuel line 37 to an appropriate combustion engine. A wear pad 38 forming part of the bottom wall 16 of the bag 10, in vertical alignment with the valve element 31 has a convex lower surface 30 so as to provide a slight protuberance engageable with the inside surface of the bottom wall 13 of the tank, as shown in FIG. 2, so as to inhibit the forming of a sealed pocket whereby to prohibit inadvertent trapping of vapors. Engagement of the wear pad 38 with the valve element 31 throughout the operating life of the bag serves to prevent wear and puncturing of the bag wall itself.

In operation the breather valve assembly 21 is attached to the collar 25 of the bag and the bag collapsed and inserted through the opening 20 in the top wall 12 of the tank. The flange 22 of the breather valve assembly is then fastened to the top wall 12 through the washer 23, thereby to effectively seal the sealing ring 27 in an annular recess 27' and around the edge of the opening 20. The area of the bag 10 is sufficiently great and the material is sufficiently flexible so that when the bag is within the chamber 18, it will expand into engagement with the walls of the chamber. If need be, the bag may be artificially inflated the first time in order to press it effectively against the chamber walls as shown in FIG. 2.

Thereafter when the tank is to be filled, a nozzle indicated generally by the reference character 43 (FIG. 12) is applied to the fill pipe 35 in the usual fashion. In order to prevent any vapors from passing outwardly from the fill pipe 35 around the nozzle, it is preferable to equip the nozzle with a sealing muff 44 (FIG. 13) adapted to engage and seal itself around the edge of the fill pipe. As liquid volatile fuel is passed into the chamber 18 in this fashion, the liquid fuel will press upwardly against the bottom wall 16 of the bag 10 collapsing the bag and expelling air from the interior space within the bag outwardly past the valve seat 32 and breather valve passage 40 into the surrounding atmosphere.

Since only air from the surrounding atmosphere was initially present in the bag, only air will be expelled and no vapors from the tank otherwise can pass to the atmospere. Filling can continue until the wear pad 38 engages the valve element 31, thereby to press the valve element against the valve seat 32 and effectively shut off the air passage 40, except for a limited access thereto through the expansion bleed holes 33. Use of the bleed holes allows air to be exhausted from the bag subsequently as liquid in the tank may expand as a result to thermal rise.

Should there by for any reason an undesirable excess of pressure within the tank 11, such pressure can be relieved by a relief plug 41 in a relief pipe 42 serving as a safety measure.

As fuel is drawn from the full fuel tank 11 through the feed port 36 and the fuel line 37, for example, to operate an appropriate combustion engine, the level of fuel in the tank 11 gradually lowers. As it lowers, the wear pad 38 moves downwardly premitting the valve element 31 to disengage from the valve seat 32 and air from the surrounding atmosphere will progressively fill the interior of the flexible bag 10 to replace liquid fuel taken from the tank during use.

On those occasions where the principle of construction can be built into a new fuel tank, a structure such as that illustrated in FIG. 5 may be employed. In this instance an upper portion 45 of the fuel tank 11' is provided with a perimetrical flange 46 which is complementary to and matches a perimetrical flange 47 on a lower portion 48 of the tank 11'. In this arrangement, a flexible diaphragm 49 is provided with a perimetrical flange 50 adapted to be clamped between the flanges 46 and 47 when the tank is initially assembled. The surface area of the diaphragm 49 is made sufficiently great so that when the tank is empty as pictured in FIG. 5, the diaphragm will assume the solid line position there shown contacting bottom and side walls of the tank. Conversely, when the tank is filled, the diaphragm will elevate to the broken line position 49', in which position a wear pad 38 will contact the breather valve assembly 21 in the same manner as previously described.

Inasmuch as the system herein above described is essentially a closed system occasions may require the relief also to be a closed system. In the embodiment of the invention shown in FIG. 6, there is provided a relief line 55 extending from the relief pipe 42 in which is a conventional spring loaded low pressure ball check valve 56, the relief line leading to an intake 57 of a conventional air cleaner 58, from which it may be passed to the air supply for the combustion engine. In the form of the device illustrated in FIG. 6 a fuel level indicator 60 is operated by a float 61, the fuel level indicator 60 being located on the bottom wall 13 of the tank. The relief line 55 is connected to a tube 55', the open end of which is located at the cross-sectional center of the intake 57, which may be a snorkle or air inlet, the opening of the tube 55' lying in a plane parallel to the direction of the air stream in the intake.

For locating the fuel level indicator at the top of the tank, the structure shown in FIGS. 7, 8, and 9 may be employed. As there shown, a breather valve assembly 65 provided with a flange 66 is confined between mounting washers 67 and 68 by means of screws 69, the mounting washers spanning an opening 70 of substantially large size. Screws 71 fasten the mounting washers 67 to the top wall 12 of the tank, by means of which a sealing bead 72 on a collar 73 of a bag 74 is made tight. In the form of FIGS. 7 and 8 a fuel level indicator 75 is secured by means of a bracket 76 to the underside of the mounting washer 68 and in that way suspended within the chamber 18 but inside of the bag 74. An arm 77 of the fuel level indicator 75 has on its free end a float 78 which is moved upwardly when engaged by the bottom wall 79 of the bag 74, as the upper level of a mass of liquid fuel 80 moves upward during filling of the tank. In this construction the arm 77 is positioned so as to underlie the valve element 31 and serves also as a means for moving the valve element 31 upwardly against the valve seat 32. Should this relationship not be preferred, an arm 77'as shown in FIG. 9 from the float level indicator 75 may bypass the valve element 31 and a wear pad 81 can be depended upon to move the valve element 31 against the valve seat 32 when the tank is full, in order to close off the breather valve in the same manner as heretofore described.

To add to the certainty of collapsing the bag 74 channels 85 are provided in the bottom wall 79, these channels preferably radiating outwardly from a central area, in order that no vapors may be trapped underneath the bottom wall 79 when the tank is emptied. Channels 86 may also be provided around the side wall structure of the bag so disposed as to improve the ease of collapsing the bag as the tank is filled with liquid fuel 80.

From the foregoing description it will be apparent that virtually any fuel tank already in existence can readily be supplied with the bag structure by the mere expedient of making use of an opening of suitable size in the top or appropriate wall structure of the tank, the size merely being big enough so that the flexible bag can be passed into the tank, inasmuch as other structure incorporated in the breather valve assembly is located on the exterior of the tank. Conventional sheet metal tanks can be readily provided with such an appropriate opening without need for removal from the vehicle itself.

An example of another type of tank is illustrated in FIG. 10 wherein there is shown a relatively long, hollow, cylindrical tank 90, of a type frequently used under ground for dispensing gasoline to appropriate surface pumps. The tank has a cylindrical side wall 91 and end walls such as the end wall 92, the tank providing a chamber 93 of such length that in it are three bags 94, 95, 96, each more or less one third the length of the tank 90 and in the aggregate substantially filling the chamber 93. Each bag is provided with an appropriate breather valve 97 of the type heretofore described.

In the embodiment of the invention in FIG. 11 there is shown a relatively shorter vertically disposed cylindrical tank 100 which as a cylindrical side wall 101, a top wall 102 and a bottom wall 103 forming a chamber 104. In the chamber is a cylindrical bag 105 substantially filling the chamber, at the top of which is a breather valve 106 such as that heretofore described. The bags for the tank 90 as well as the bag for the tank 100 are of such construction and appropriate holes in the tank of such size that the bags can be inserted into the completed tank through appropriate holes in the same fashion as heretofore described in connection with the other forms of the invention.

When a tank is to be used for the storage of grain, for example, the system herein described has a special advantage. It is common knowledge that grain contains animal organisms in a dormant stage which can under appropriate condition produce weevils. Also rodents often get into grain storage supplies. By introducing a nontoxic gas such as $CO^2$ into the tank, sealed as heretofore described by use of an air breathing bag, the $CO^2$ is held captive. Weevil production is not possible in the absence of oxygen and animal life is suffocated and destroyed, without damage to the contents.

Explosive dust such for example as coal dust can be similarly stored and sealed by the system to prevent possible explosion as can occur when such dust is exhausted to the atmosphere.

The tanks customarily used for storage of grain and powdered materials have shapes such as shown in FIGS. 10 and 11. Here, as well as in conventional fuel tanks, should it be necessary to locate the breather valve somewhere other than at the top, as for example on the side wall, such a location is made possible by use of a suitable conventional linkage from the float.

Details of the nozzle 43 and muff 44 previously made reference to are shown in FIGS. 12, 13, 14 and 15. As there shown, the fill pipe 35 is provided with a customary gas cap lock flange 110 which provides access to a passage 111. A spout 112 projecting from a body 113 of the nozzle is adapted to inject liquid fuel into the passage 111 of the fill pipe 35. The muff 44 is of hollow construction also provided with a collar 114 surrounding the base of the spout 112, the collar being of diameter large enough to overlie the entire rim of the gas cap lock flange 110. An inner sleeve 115 extending from the collar snugly surrounds the spout 112 in sealed relationship. An outer sleeve 116 is somewhat frusto-conical in shape and is spaced from the inner sleeve 115. The outer sleeve 116 is provided with a hollow bead 117 of diameter large enough to seal against the wall of the passage 111 and to releasably lock beneath the gas cap lock flange in the manner shown in FIG. 12. When applied as there shown, the entrance of the fill pipe 35 is completely sealed during the filling operation thereby confining all volatile gases which may be generated during a filling operation to the fuel tank. When such a muff construction is employed on the nozzle, it becomes a component part of a system for the control of fuel tank vapors, in combination with the bag accessory for the tank hereinabove described.

While the invention has herein been shown and described in what is conceived to be a practical and effective embodiment, it is recognized that departures may be made therefrom within the scope of the invention, which is not to be limited to the details disclosed herein, but is to be accorded the full scope of the claims so as to embrace any and all equivalent devices.

Having described the invention, what is claimed as new in support of Letters Patent is:

1. A tank for storing and dispensing a volatile fluid comprising top, bottom, and side walls forming a closed chamber, fill pipe and discharge means for said chamber located on said tank, a flexible bag having top, bottom, and side walls corresponding generally to the top, bottom, and side walls of the tank on the inside thereof, an opening through one of the walls of the tank separate from said fill pipe, an opening in said bag conincident with the opening in the tank, a collar around the opening in the bag comprising a seal between the respective tank wall and the bag, and a breather valve operatively associated with said openings for passing air between the interior of said bag respectively filling and emptying said tank, said breather valve assembly comprising a body having a passage therethrough, a breather valve seat for said passage, a valve element operably associated with said valve seat and constantly open bleed passage means between the passage and the interior of the bag bypassing said valve seat, and means responsive to the level of liquid in the tank adapted to close the valve element on the valve seat when the liquid level reaches a pre-set elevation.

2. A tank accprding to claim 1 wherein there is a removable clamping collar, which in operative position is in engagement respectively with the breather valve and the collar of the bag whereby to releasably seal the opening of the bag relative to the tank.

3. A tank accprding to claim 1 wherein there is means forming depressions in the exterior of walls of said bag whereby to vent space between the exterior of the bag and the interior surface of the tank and inhibit formation of sealed pockets.

4. A tank accprding to claim 1 wherein there is a float level indicator in the tank between the bag and the interior wall of the chamber responsive to the level of volatile fluid in the chamber.

5. A tank according to claim 1 wherein there is a fill pipe on the tank, and a fill nozzle having a sealing collar thereon, said collar having a sealing engagement with the fill pipe when the nozzle is inserted into said pipe during a tank filling operation.

6. A tank according to claim 1 wherein there is a fill pipe on the tank and a fill nozzle for said fill pipe having a sealing means between itself and the fill pipe when the tank is being filled.

7. A tank according to claim 1 wherein said means responsive to the level of liquid is a portion of the bag.

8. A tank according to claim 1 wherein said means responsive to the level of liquid is a float.

9. A tank according to claim 8 wherein the float is inside the bag.

10. A tank according to claim 8 wherein the float is within the tank and located outside the bag.

11. A tank according to claim 1 wherein there is a pressure relief means in communication between the interior of the tank adjacent the top thereof and the atmosphere.

12. A tank according to claim 11 wherein the pressure relief means is a spring loaded low pressure ball check valve.

13. A tank according to claim 1 wherein there is a pressure relief means between the tank and a location remote from the tank.

* * * * *